(12) United States Patent
Frachon et al.

(10) Patent No.: US 9,207,100 B2
(45) Date of Patent: Dec. 8, 2015

(54) MAGNETIC POSITION SENSOR WITH FIELD DIRECTION MEASUREMENT AND FLUX COLLECTOR

(75) Inventors: Didier Frachon, Besançon (FR); Gérald Masson, Besançon (FR); Stéphane Biwersi, Frambouhans (FR)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 610 days.

(21) Appl. No.: 13/125,768

(22) PCT Filed: Sep. 28, 2009

(86) PCT No.: PCT/FR2009/001151
§ 371 (c)(1),
(2), (4) Date: Jul. 8, 2011

(87) PCT Pub. No.: WO2010/046550
PCT Pub. Date: Apr. 29, 2010

(65) Prior Publication Data
US 2011/0254543 A1 Oct. 20, 2011

(30) Foreign Application Priority Data

Oct. 24, 2008 (FR) ...................................... 08 05953

(51) Int. Cl.
*G01B 7/30* (2006.01)
*G01D 5/14* (2006.01)
(52) U.S. Cl.
CPC ...................................... *G01D 5/145* (2013.01)
(58) Field of Classification Search
CPC ....................................................... G01R 33/00
See application file for complete search history.

(56) References Cited

U.S. PATENT DOCUMENTS

| 3,061,771 A | 10/1962 | Planer et al. |
| 4,785,242 A | 11/1988 | Vaidya et al. |

(Continued)

FOREIGN PATENT DOCUMENTS

| CN | 101384883 | 3/2009 |
| DE | 102 39 904 | 3/2004 |

(Continued)

*Primary Examiner* — Tung X Nguyen
*Assistant Examiner* — Feba Pothen
(74) *Attorney, Agent, or Firm* — Harness, Dickey & Pierce, P.L.C.

(57) ABSTRACT

The present disclosure relates to a magnetic position sensor with field direction measurement and a flux collector. The disclosure proposes to measure two magnetic induction components at one and the same point, harmonizing the amplitude of the two magnetic induction components using flux collectors so as to have a ratio of the amplitudes of these two components close to one. For this purpose, the disclosure provides a contactless position sensor including at least one permanent magnet, emitting a magnetic field, at least one detection element sensitive to the direction of the magnetic field, and at least one pair of flux collectors, the permanent magnet being capable of moving in a direction of displacement and having a direction of magnetization that can be continuously varied according to the direction of displacement. Each flux collector has at least one portion, provided with an end, extending substantially along the direction of displacement of the magnet. The ends of a pair of flux collectors define a gap oriented along the direction of displacement of the magnet. The detection element is positioned outside the gap and substantially equidistant from the ends.

18 Claims, 10 Drawing Sheets

(56) References Cited

U.S. PATENT DOCUMENTS

| | | |
|---|---|---|
| 4,966,041 A | 10/1990 | Miyazaki |
| 5,070,298 A | 12/1991 | Honda et al. |
| 5,159,268 A | 10/1992 | Wu |
| 5,164,668 A * | 11/1992 | Alfors .................. 324/207.2 |
| 5,250,925 A | 10/1993 | Shinkle |
| 5,351,387 A | 10/1994 | Iwata et al. |
| 5,416,410 A | 5/1995 | Kastler |
| 5,444,313 A | 8/1995 | Oudet |
| 5,528,139 A | 6/1996 | Oudet et al. |
| 5,532,585 A | 7/1996 | Oudet et al. |
| 5,614,668 A * | 3/1997 | Ramirez-Soto ......... 73/114.43 |
| 5,670,876 A | 9/1997 | Dilger et al. |
| 5,781,005 A | 7/1998 | Vig et al. |
| 5,814,985 A | 9/1998 | Oudet |
| 5,942,895 A | 8/1999 | Popovic et al. |
| 6,043,645 A | 3/2000 | Oudet et al. |
| 6,043,646 A | 3/2000 | Jansseune |
| 6,087,827 A | 7/2000 | Oudet |
| 6,184,679 B1 * | 2/2001 | Popovic et al. ............... 324/251 |
| 6,219,212 B1 | 4/2001 | Gill et al. |
| 6,304,078 B1 | 10/2001 | Jarrard et al. |
| 6,326,781 B1 | 12/2001 | Kunde et al. |
| 6,518,749 B1 | 2/2003 | Oudet et al. |
| 6,545,463 B1 | 4/2003 | Dettmann et al. |
| 6,573,709 B1 | 6/2003 | Gandel et al. |
| 6,576,890 B2 | 6/2003 | Lin et al. |
| 6,593,734 B1 | 7/2003 | Gandel et al. |
| 6,922,052 B2 | 7/2005 | Steinruecken et al. |
| 6,992,478 B2 | 1/2006 | Etherington et al. |
| 7,028,545 B2 | 4/2006 | Gandel et al. |
| 7,030,608 B2 | 4/2006 | Kawashima et al. |
| 7,049,808 B2 | 5/2006 | Martinez et al. |
| 7,088,096 B2 | 8/2006 | Etherington et al. |
| 7,116,210 B2 | 10/2006 | Lawrence et al. |
| 7,221,153 B2 * | 5/2007 | Matsumoto et al. ..... 324/207.25 |
| 7,239,131 B2 * | 7/2007 | Halder et al. ............ 324/207.21 |
| 7,304,450 B2 | 12/2007 | Prudham |
| 7,501,929 B2 | 3/2009 | Lawrence et al. |
| 7,589,445 B2 | 9/2009 | Gandel et al. |
| 7,644,635 B2 | 1/2010 | Prudham et al. |
| 7,741,839 B2 | 6/2010 | Jarrard |
| 7,784,365 B2 | 8/2010 | Masson et al. |
| 7,898,122 B2 | 3/2011 | Andrieux et al. |
| 7,906,959 B2 | 3/2011 | Frachon et al. |
| 8,519,700 B2 * | 8/2013 | Jerance et al. ........... 324/207.25 |
| 2002/0113678 A1 * | 8/2002 | Creighton .................... 335/306 |
| 2003/0137293 A1 * | 7/2003 | Welsch et al. ............. 324/207.2 |
| 2003/0155909 A1 | 8/2003 | Steinruecken et al. |
| 2004/0130314 A1 | 7/2004 | Bossoli et al. |
| 2004/0164733 A1 * | 8/2004 | Fukaya et al. ........... 324/207.25 |
| 2005/0218727 A1 | 10/2005 | Gandel et al. |
| 2006/0123903 A1 | 6/2006 | Gandel et al. |
| 2007/0008063 A1 | 1/2007 | Lawrence et al. |
| 2007/0090827 A1 | 4/2007 | Jarrard |
| 2008/0250873 A1 | 10/2008 | Prudham et al. |
| 2008/0284261 A1 | 11/2008 | Andrieux et al. |
| 2008/0314164 A1 | 12/2008 | Masson et al. |
| 2010/0045275 A1 | 2/2010 | Frachon |
| 2010/0194385 A1 | 8/2010 | Ronnat et al. |
| 2010/0231205 A1 | 9/2010 | Jerance et al. |
| 2010/0253324 A1 | 10/2010 | Jarrard |
| 2011/0043194 A1 | 2/2011 | Frachon et al. |

FOREIGN PATENT DOCUMENTS

| | | |
|---|---|---|
| DE | 102006051621 | 5/2008 |
| EP | 0 273 481 | 7/1988 |
| EP | 0 665 416 | 8/1995 |
| EP | 1 014 039 | 6/2000 |
| EP | 1 477 772 | 11/2004 |
| EP | 1 532 425 | 5/2005 |
| FR | 2 670 286 | 6/1992 |
| FR | 2 724 722 | 3/1996 |
| FR | 2 764 372 | 12/1998 |
| FR | 2 790 549 | 9/2000 |
| FR | 2 809 808 | 12/2001 |
| FR | 2 845 469 | 4/2004 |
| FR | 2 893 410 | 5/2007 |
| FR | 2 898 189 | 9/2007 |
| FR | 2 919 385 | 1/2009 |
| KR | 2008-0077369 | 8/2008 |
| KR | 2008-0104048 | 11/2008 |
| WO | WO 2007/057563 | 5/2007 |
| WO | WO 2007/099238 | 9/2007 |
| WO | WO 2009/101270 | 8/2009 |

* cited by examiner

MAGNETIC POSITION SENSOR WITH FIELD DIRECTION MEASUREMENT AND FLUX COLLECTOR

CROSS-REFERENCE TO RELATED APPLICATIONS

This application is a National Phase Entry of International Application No. PCT/FR2009/001151, filed on Sep. 28, 2009, which claims priority to French Patent Application Serial No. 08/05953, filed on Oct. 24, 2008, both of which are incorporated by reference herein.

TECHNICAL FIELD

The present invention relates to the field of analog, contactless, linear or rotary, position magnetic sensors. The analog sensors that detect the position from the direction of a magnetic field have several advantages:
  no mechanical contact with the moving part, and thus no wear,
  no sensitivity to dirt,
  reduced production cost,
  long life span,
  no sensitivity to temperature,
  reduced sensitivity to geometric tolerances and to the positioning of the permanent magnet For example, the contactless position sensors that measure the position by means of the magnetic field direction are insensitive to the temperature effect on the magnetic properties of the permanent magnets conversely to the sensors that measure the position by measuring the amplitude of a single component of the magnetic field. The measurement of a magnetic field direction is achieved through a ratio of at least two components of the magnetic field which vary identically in temperature. Therefore, the computation of the ratio makes it possible to overcome the variation caused by temperature.

BACKGROUND

In the field of rotary sensors that measure the magnetic field direction there are rotary sensors that use a permanent magnet at the tip of a rotating shaft of which position is to be measured and at least two magnetically-sensitive members that measure the magnetic field direction on the rotation axis of the moving shaft. However, these devices exhibit restrictions particularly when it comes up to measuring the rotary displacement of a shaft passing through the sensor itself because, in this case, it is impossible to place the magnetically-sensitive members on the rotation axis of the system. In the case of linear sensors, there are structures that use an axially magnetized disk magnet and at least two magnetically-sensitive members that measure the magnetic field direction but these sensors are limited to linear strokes as low as about 20 mm because the amplitude of both components used for the measurement of the field direction becomes too low when the stroke to be measured rises.

It is known from prior art, patent FR2893410 of the applicant, which uses two components of the magnetic induction, generated by a substantially diametrically magnetized ring magnet, measured in a single and same place located close to the median plan of the magnet. A computation of the arctangent of the ratio of both induction components (radial and tangential component) makes it possible to derive the angular position of the magnet. It is however necessary to apply beforehand a correction factor between these two components, in fact in this sensor, the amplitude of both components of the magnetic induction is substantially different.

Typically, this report varies in the range of 1.5 to 4 but the more the magnet diameter is large the more this ratio increases. The increase of the ratio is mainly due to the reduction in the tangential component. For the large diameter magnets, the amplitude of the tangential component is such that it becomes incompatible with the magnetically sensitive members that are conventionally used for this type of sensor and therefore the measurement of the angular position of the magnet is no longer satisfactorily guaranteed. Likewise, the weak amplitude of the tangential component makes the sensor sensitive to the magnetic disruptions that can apply on the sensor.

This correction factor can also lead to problems of measurement precision and the higher this factor is the greater the mistake will be. Furthermore, the necessity of having an amplification ratio between both components before the computation of the position (arctangent) leads to an incompatibility of these systems with certain types of magnetically sensitive members (e.g.: magneto-resistor). Furthermore, there are solutions of revolutions count, for applications of flywheel angle sensor, based on magneto-resistors as described for example in patent EPI 532425B1 which requires that the ratio between both components be lower than 1.5 and that the amplitudes of both components be close to 200 G.

It is also known from the related art, U.S. Pat. No. 0,208,727 illustrated by FIG. 1a. This document describes a position sensor rotating on 360° and which uses two magnetically sensitive probes A4, A5 that are angularly offset by 90° and 4 ferromagnetic pieces A10 in order to determine the angular position of a substantially diametrically magnetized disc A2 magnet. The two 2 magnetically sensitive members A4, A5, sensitive to the amplitude of the magnetic induction generated by magnet A2, are positioning in the 2 air-gaps defined by the 4 ferromagnetic pieces A10 that allow the equalization of the amplitudes of the ferromagnetic field components. In this structure, the volume of the ferromagnetic pieces is very important and the construction of such a sensor is difficult because it requires a precise positioning of these ferromagnetic pieces A10. This leads to an important manufacturing cost.

It is also known from the related art, patent documents no. US 2002/0179825 and U.S. Pat. No. 5,942,895 describing respectively an angular position magnetic sensor with and a magnetic sensor provided with concentrators arranged to restrict the measurement to one of the components of the measured magnetic field. Meanwhile, the teaching of these documents does not carry out a reliable position detection from a magnet with a magnetization direction that is continuously variable along its displacement direction, nor even to respond to the technical problems that are previously mentioned.

SUMMARY

The aim of the present invention is to solve all or part of the aforementioned problems by measuring two components of magnetic induction in a single and same point and by harmonizing the amplitude of both components of the magnetic induction, by means of flux collectors, in order to have an amplitude ratio between these two components of magnetic induction that is close to 1. Such an amplitude ratio makes it possible to use a larger choice of magnetically sensitive members (Hall effect probe, AMR . . . ).

In a first configuration, the sensor comprises a substantially diametrically magnetized ring magnet, a detection member capable of measuring two components of the magnetic induction in a single and same point and two flux collectors that are positioned on the exterior periphery of the magnet. Both components of the magnetic induction are measured in an axially offset plan with respect to the lower face of the collectors. The flux collectors can be molded directly in the sensor casing.

In another configuration, the flux collectors are folded and are directly fixed on the printed circuit supporting the detection elements. According to another alternative, the collectors will be combined to contactless, angular or linear position magnetic sensors as described in patent application FR2898189 of the applicant, whose content is incorporated herein by reference. The described alternatives are not limiting. For example, the collectors can be combined to a contactless, absolute revolution counter magnetic system.

In this regard, the invention relates to a contactless position sensor including at least a permanent magnet emitting a magnetic field, at least a detection member that is sensitive to the magnetic field direction and at least a pair of flux collectors, the permanent magnet being capable of moving in a displacement direction and having a continuously variable magnetization direction along the displacement direction. Each flux collector has at least one portion, provided with an end, extending substantially along the displacement direction of the magnet. The ends of a pair of flux collectors define an air gap oriented along the displacement direction of the magnet. The detection element is positioned outside said air gap and substantially equidistant from the ends.

It is well known that each permanent magnet presents a magnetization of which direction is defined by a magnetization vector. This magnetization vector defines the magnetic field direction inside the magnet. This direction depends on the way the magnet is polarized when produced. For example, a non polarized magnet with the form of a "ring" placed in a sufficient homogenous unidirectional magnetic field will have its magnetization oriented direction along the direction of this magnetic field. In the case where the magnetic field is oriented along a direction perpendicular to the rotation axis of the magnet (a so called magnetization of diametric type) and if this magnet moves rotationally around its axis, the direction of magnetization as seen in a fixed point in the space inside the magnet will then be continuously variable along a linear function.

Preferably, the direction of magnetization of the permanent magnet varies in a linear way. It is the case when the direction of magnetization varies proportionally to the magnet displacement. Advantageously, the direction of magnetization of the permanent magnet varies periodically. It is the case when the direction of magnetization takes the same value when the magnet moves by a predetermined distance.

Preferably, the permanent magnet is substantially cylindrical. Advantageously, the permanent magnet is substantially parallelepiped. Preferably, the flux collectors also present a folding portion. Advantageously, the magnetic sensor includes two pairs of collectors, each pair of collectors defining an air gap, the detection element being positioned equidistant from the four ends of the collectors defining said air gaps. Preferably, the detection element is capable of counting in an absolute way the number of magnet revolutions.

According to an advantageous embodiment, the sensor includes at least a second detection element capable of measuring the angular position of the magnet over 360°. Preferably, the second detection element is combined to at least a pair of flux detectors. Each flux collector has at least a portion, provided with an end, extending substantially along the displacement direction of the magnet. The ends of the pair of flux collectors define an air gap oriented along the displacement direction of the magnet. The detection element is positioned outside said air gap and substantially equidistant from the ends.

Advantageously, the detection elements are positioned on either side of a printed circuit. Preferably, a magnetic shielding element is available in the vicinity of at least one of the detection elements.

BRIEF DESCRIPTION OF THE DRAWINGS

Other characteristics and advantages of the invention will be more apparent from the reading of detailed exemplary embodiments, with reference to the figures which respectively represent.

DETAILED DESCRIPTION OF AN EMBODIMENT

Figure 1A:
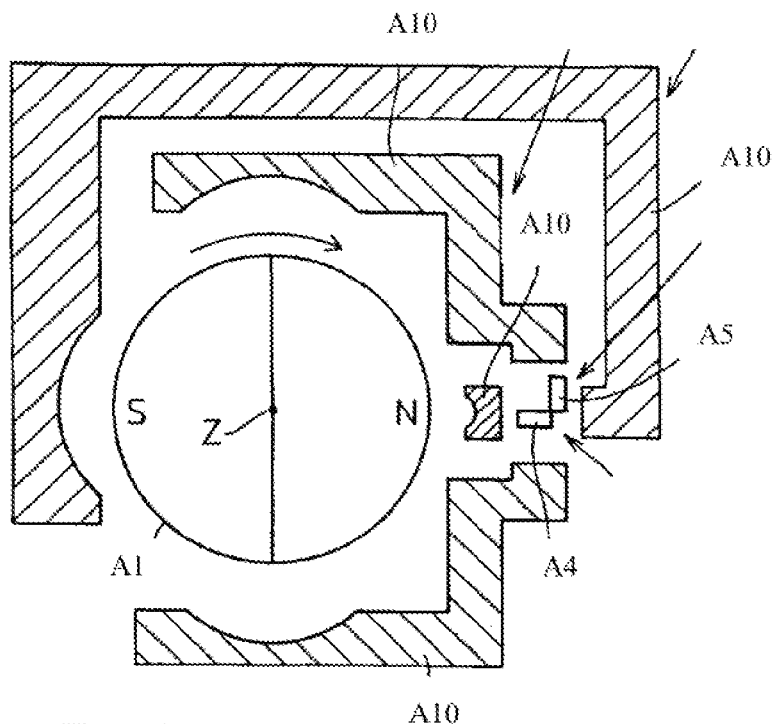
FIG. 1a, is a cross-sectional view of a rotary sensor pertaining to the related art.

FIG. 1a represents a structure of a rotary sensor according to prior art. The magnetic flux generated by a substantially diametrically magnetized permanent magnet A1 is collected in the periphery thereof by 4 ferromagnetic pieces A10 that form 2 measurement air gaps. In these two measurement air gaps, two detection elements A4, A5 measure two components of the magnetic induction along two orthogonal axis.

Figure 1B:
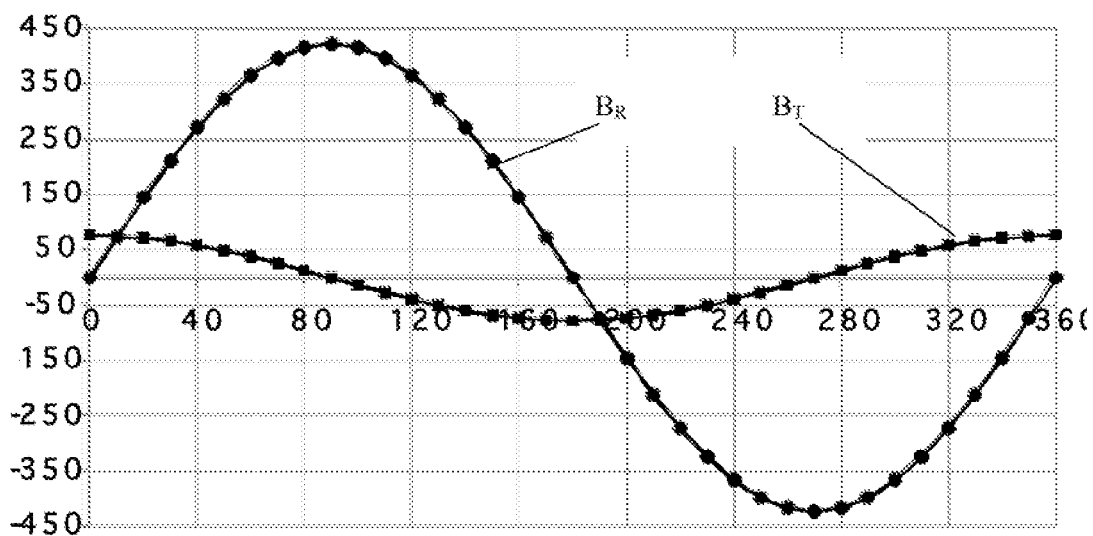
FIG. 1b, is a diagram representing the radial and tangential components of the magnetic induction measured by a device of prior art at a point located in the exterior periphery of a diametrically magnetized ring magnet.

FIG. 1b represents two, radial BR and tangential BT, components of a magnetic induction measured by a device of the prior art in the exterior periphery of a substantially diametrically magnetized ring magnet. The computation of the position is then made following the amplification of the tangential component and an arctangent computation of the ratio of both components of the magnetic induction.

Figure 2:
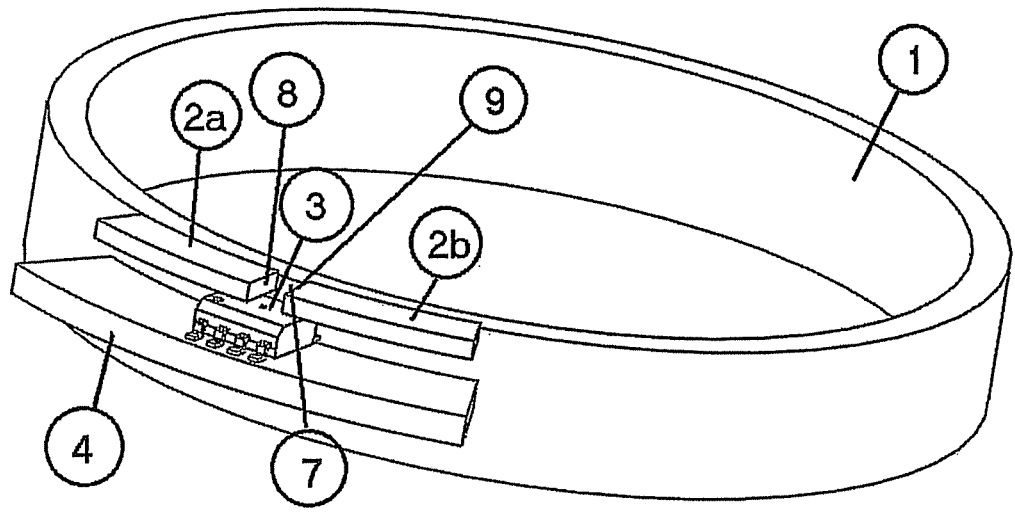
FIG. 2, is a perspective view of an exemplary embodiment of a magnetic sensor exhibiting two flux collectors according to the invention.

FIG. 2 represents a structure of the rotary sensor according to the present invention. Two flux collectors 2a and 2b are located in the periphery of a substantially diametrically magnetized ring magnet 1. These collectors form an air gap 7 defined by two of their ends 8 and 9. The measurement of the induction along two directions is carried out in a single and same point by a detection element 3 positioned on a PCB 4 and located in a plane offset with respect to the inferior surface of the flux collectors 2a and 2b thus, outside air gap 7. The computation of the angular position of the magnet is performed by the computation of the arctangent of the ratio of both induction components possibly after a normalization of the components.

Figure 3:
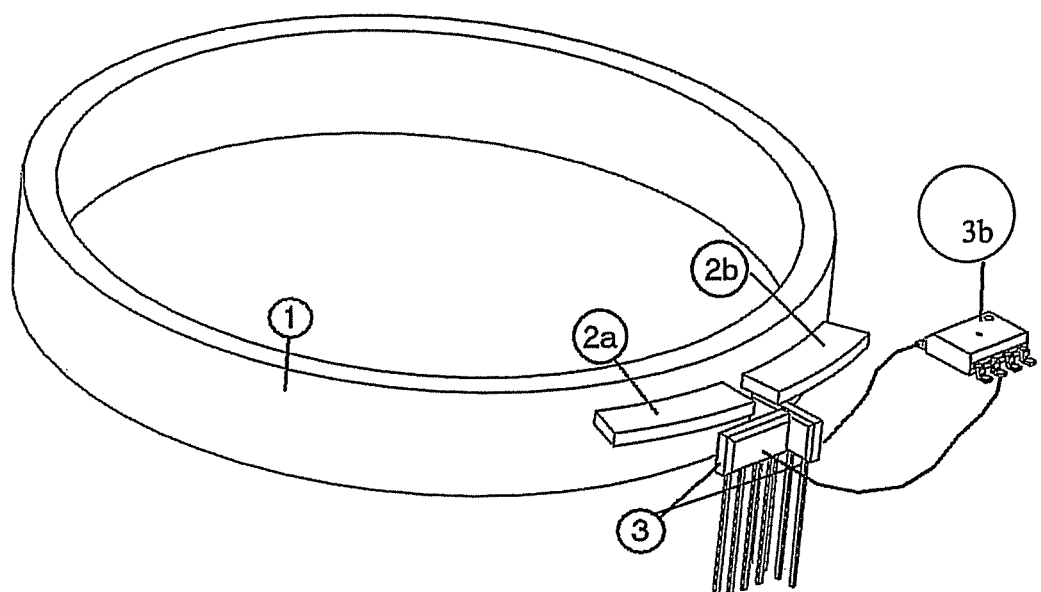
FIG. 3, is a perspective view of an exemplary embodiment of a magnetic sensor according the invention exhibiting two detection elements in two distinct casings.

FIG. 3 illustrates a configuration of a high stroke rotary sensor according to the present invention with a ring magnet 1, two flux collectors 2a and 2b located near the periphery of the permanent magnet and two detection elements 3 in two distinct casings each measuring a component of the magnetic field. In such a configuration, the computation of the angle by means of both components of the magnetic field must be realized by means of an external component 3b.

Figure 4:
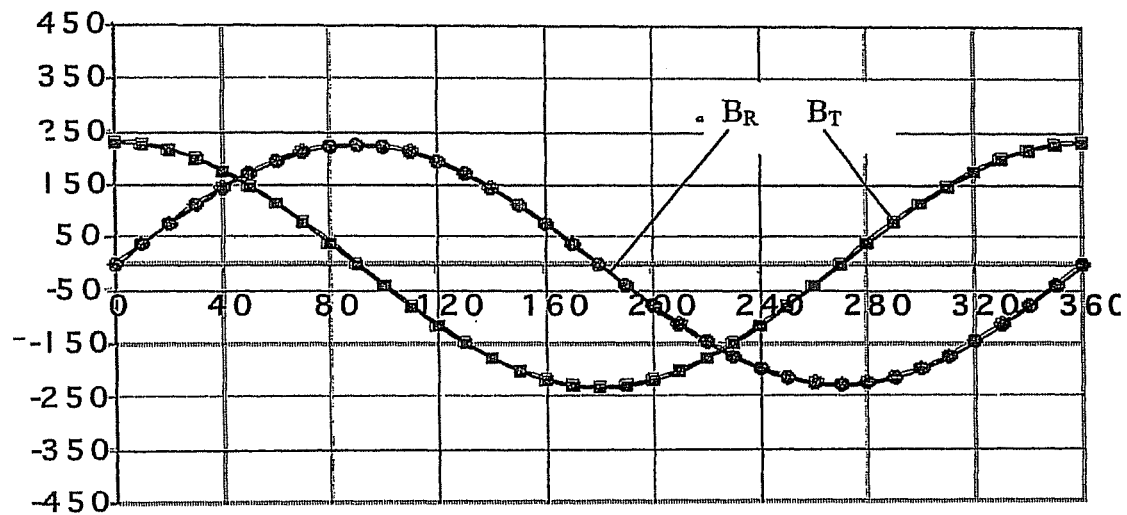
FIG. 4, is a diagram representing the radial and tangential components of the magnetic induction that is measured, by a sensor according to the invention exhibiting two flux collectors located around the permanent magnet, in a point located in the exterior periphery of a diametrically magnetized ring magnet.

FIG. 4 is a diagram representing the radial BR and tangential BT components of the magnetic induction measured in a single and same point depending on the rotation angle of magnet 10 of the device of FIG. 3. It appears in light of this diagram that the radial BR and tangential BT components of the measured tangential induction exhibit a substantially equal amplitude.

Figure 5:
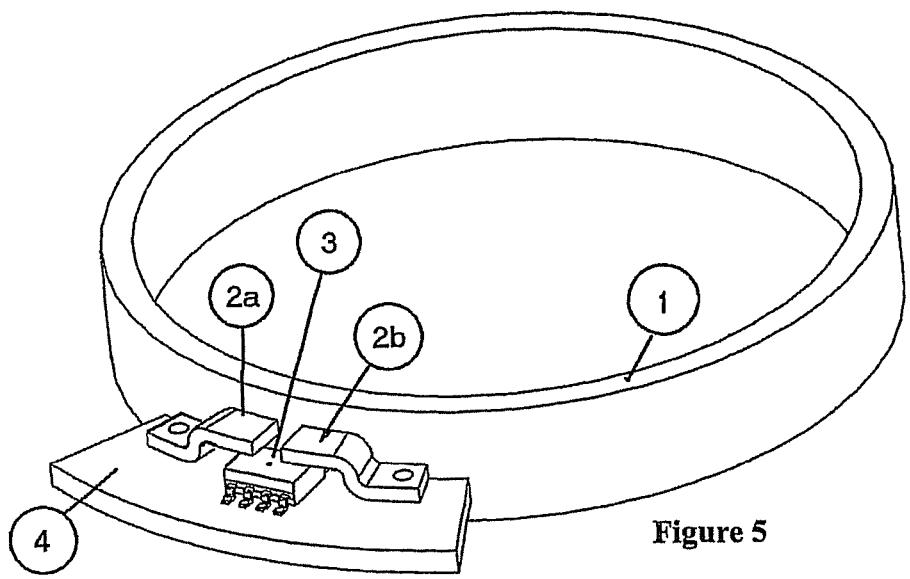
FIG. 5, is a perspective view of an exemplary embodiment of a magnetic sensor according to the invention exhibiting folded collectors.

FIG. 5 represents an embodiment of a rotary sensor according to the present invention with a substantially diametrically magnetized permanent magnet 1 and two flux collectors 2a and 2b folded to be directly fixed on the PCB 4 supporting the detection element 3.

Figure 6:
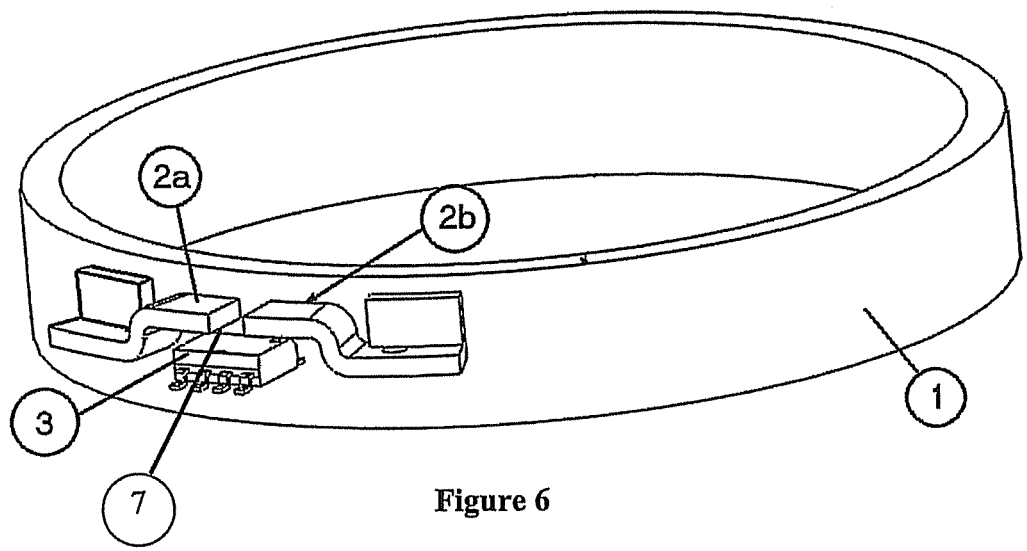
FIG. 6, is a perspective view of an exemplary embodiment of a magnetic senor according to the invention exhibiting two collectors folded along two directions.

FIG. 6 represents an embodiment of a rotary sensor according to the present invention with a substantially diametrically magnetized 1 permanent magnet and two flux collectors 2a and 2b folded to be directly fixed on the PCB, not shown, supporting the detection element 3 and further folded to increase the collection surface of the flux in front of the exterior face of the permanent magnet. Increasing the collection surface, 1 rises the tangential component of the magnetic field at the detection element.

Figure 7:
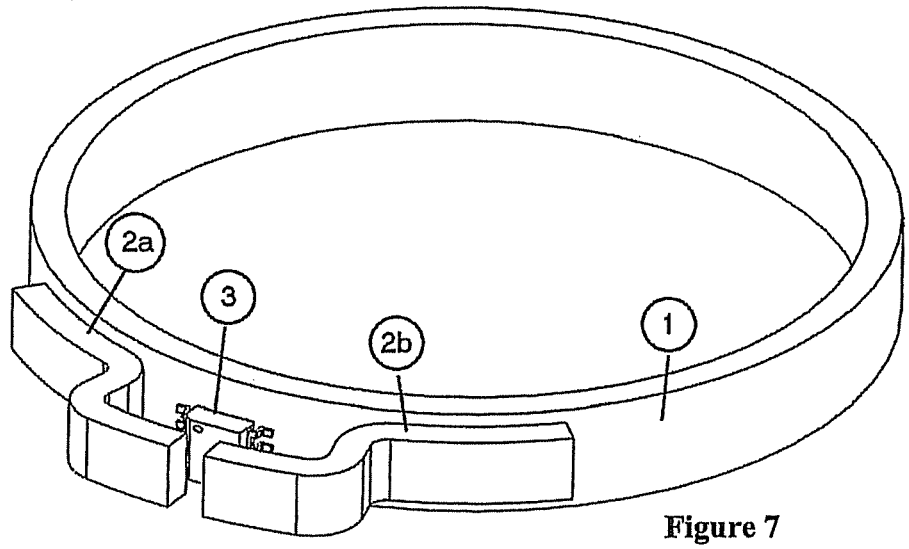
FIG. 7, is a perspective view of an exemplary embodiment of a magnetic sensor according to the invention exhibiting two flux collectors and a probe positioned in parallel to the exterior face of the magnet.

FIG. 7 represents a configuration of the present invention in which the detection element 3 is contained in a casing placed in parallel to the exterior surface of the ring magnet 1. The flux collectors 2a and 2b are placed in such a way as to bring back the tangential flux generated by the magnet at the detection element.

Figure 8:
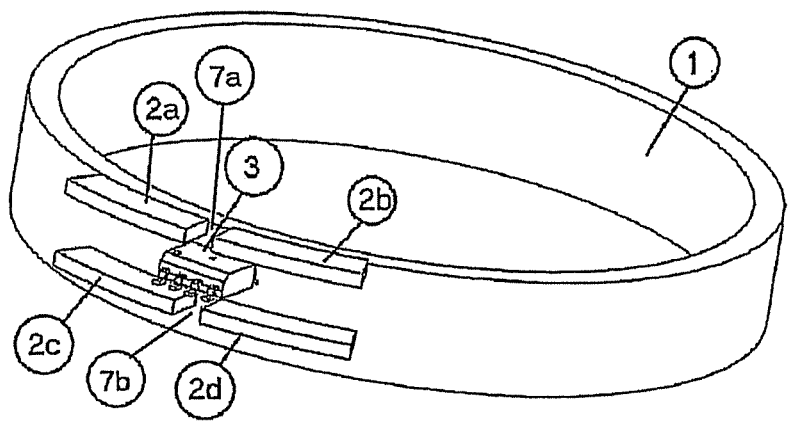
FIG. 8, is a perspective view of an exemplary embodiment of a magnetic sensor according to the invention exhibiting four flux collectors.

FIG. 8 represents a sensor according to the present invention with a substantially diametrically magnetized ring magnet 1 and 4 flux collectors 2a, 2b, 2c and 2d. These four flux collectors define on a pair basis, two air gaps 7a and 7b which are located on either side of the detection element 3.

Figure 9:
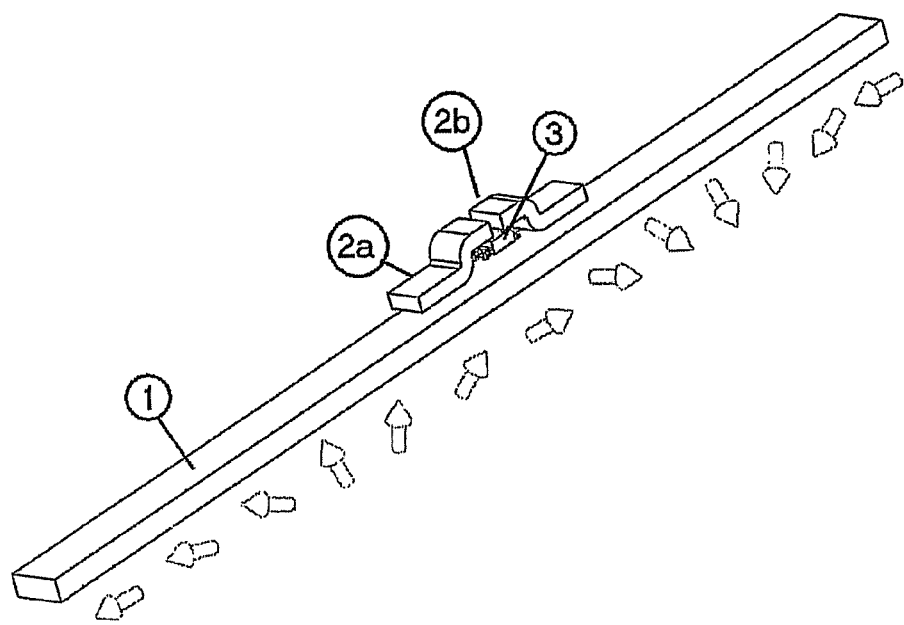
FIG. 9, is a perspective view of a first exemplary embodiment of a high stroke linear magnetic sensor according to the invention exhibiting two collectors.

FIG. 9 represents a linear alternative of the sensor according to the present invention with a band-shaped magnet 1 exhibiting a direction of magnetization which varies linearly along the magnet 1 and two flux collectors 2a and 2b positioned on either side of the detection element 3. The sides of collectors 2a and 2b are parallel to the sides of the permanent magnet 1. The detection element 3 measures the longitudinal component and the perpendicular component with respect to the magnet 1. On this same figure, the direction of magnetization is varies continuously along the displacement direction of the magnet.

Figure 10:
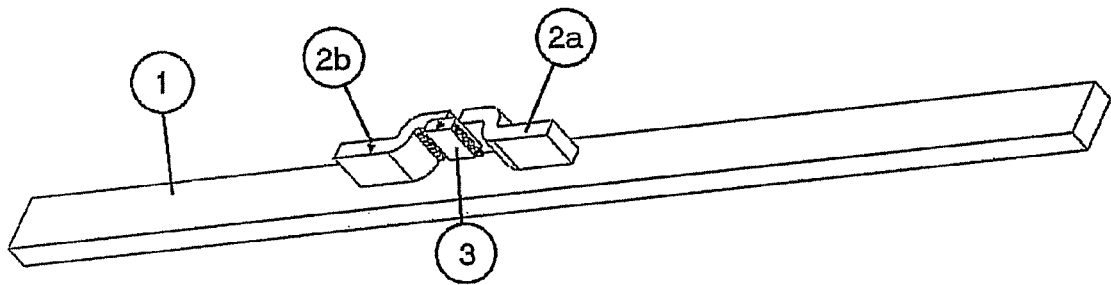
FIG. 10, is a perspective view of a second exemplary embodiment of a high stroke linear magnetic sensor according to the invention exhibiting two collectors.

FIG. 10 represents a second linear alternative of the sensor according to the present invention with a band-shaped magnet 1 representing a direction of magnetization which varies linearly along the magnet and two flux collectors 2a and 2b positioned on either side of the detection element 3. The sides of collectors 2a and 2b are perpendicular to the sides of the permanent magnet 1. The detection element 3 measures the longitudinal component and the perpendicular component with respect to magnet 1.

Figure 11A:
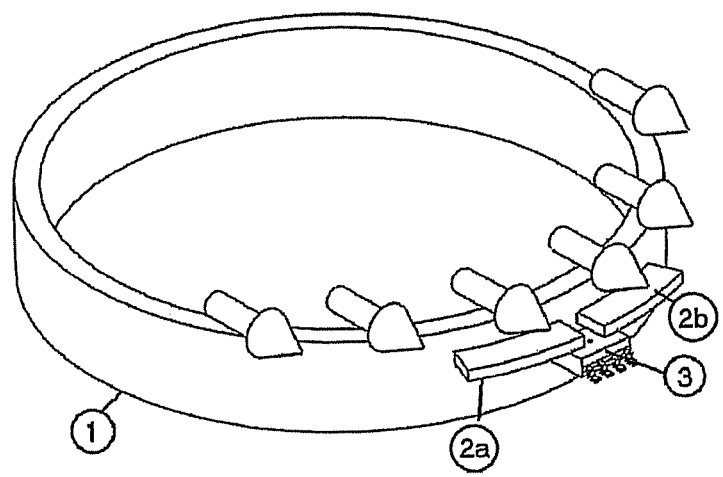
FIG. 11a, is a diagram representing the direction of magnetization of the ring magnet for a configuration of a rotary sensor according to the present invention which is applied to the measurement of a high angular stroke.

FIG. 11a represents a rotary sensor for high angular stroke applications to be measured, that is to say, close to 360°, according to the present invention with a representation of the direction of magnetization which varies continuously over the 360° of the ring magnet 1. The rotation of the angle of magnetization along the periphery of the magnet is of 360° over the entirety of the periphery of the ring magnet.

Figure 11B:
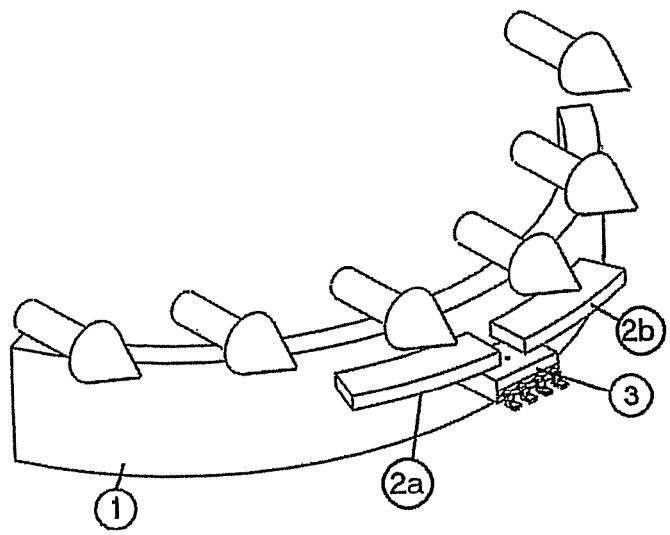
FIG. 11b, is a diagram representing the direction of magnetization of a tile magnet for a configuration of a rotary sensor according to the present invention which is applied to the measurement of a small angular stroke.

FIG. 11b represents a rotary sensor for angular measurement applications over a restricted stroke, that is to say, much lower than 360°, according to the present invention. The angular width of the magnet 1 is adjusted to the useful stroke to be measured in order to reduce the necessary magnet volume to the minimum. The direction of magnetization is represented on the considered magnet sector for the useful stroke of the sensor. The rotation of the angle of magnetization along the periphery of the magnet 1 is substantially equal to the angular width of the considered magnet 1 for the stroke to be measured.

Figure 11C:
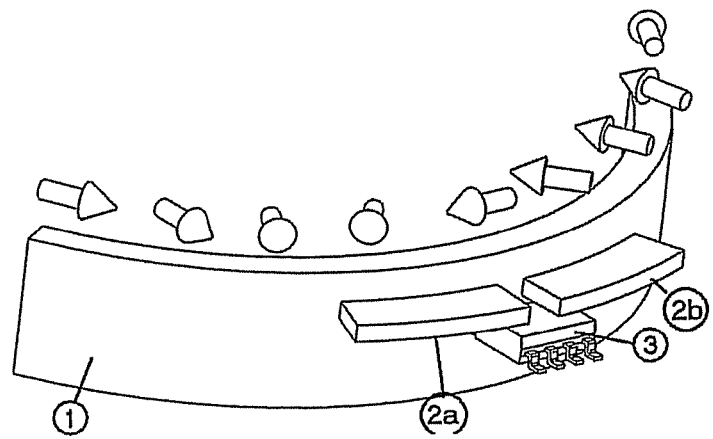
FIG. 11c, is a diagram representing the direction of magnetization of a tile magnet for another configuration of the rotary sensor according to the present invention which is applied to the measurement of a small angular stroke.

FIG. 11c represents a rotary sensor for angular measurement applications on a restricted stroke which is much lower than 360° according to the present invention. The direction of magnetization is also represented and varies by 360° over the entire periphery of the ring magnet 1.

Figure 12:
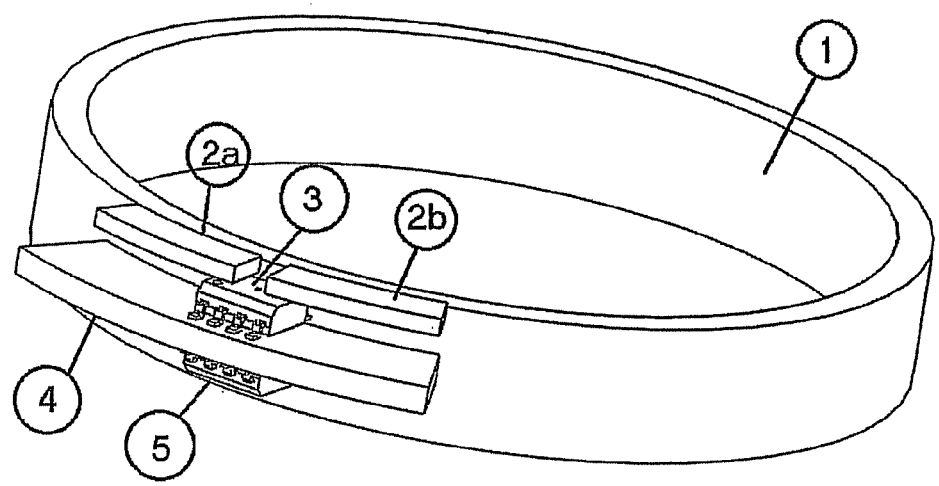
FIG. 12, is a perspective view of an exemplary embodiment of a structure according to the present invention integrating the measurement of the angle of a ring magnet over 360° as well as a counting device of the revolution count of the permanent magnet with 2 collectors and two components on either side of a printed circuit.

FIG. 12 represents an alternative of a rotary sensor according to the present invention for angular measurement applications over a stroke that is higher than 360° rotation of the element to be measured over several revolutions. The device comprises a substantially diametrically magnetized 1 ring magnet, two flux collectors 2a and 2b and a detection element 3 which is capable of measuring in an absolute way the number of revolutions performed by the magnet. The detection element 3 is positioned near one of the ends of the flux collectors 2a and 2b. This detection element 3 is placed on the upper part of a PCB 4 acting as a support. A second detection element 5 measuring the radial and tangential components of the magnetic induction generated by the permanent magnet is placed under the same PCB 4. The second detection element 5 makes it possible to know the angular position of the permanent magnet 1 over a stroke close to 360°. Such a configuration makes it possible to minimize the surface of PCB 4 which is necessary to the implantation of the two detection elements 3, 5, but it is possible to place the second detection element 5 on the same side of the PCB 4 but angularly offset with respect to the first detection element 3.

Figure 13A:
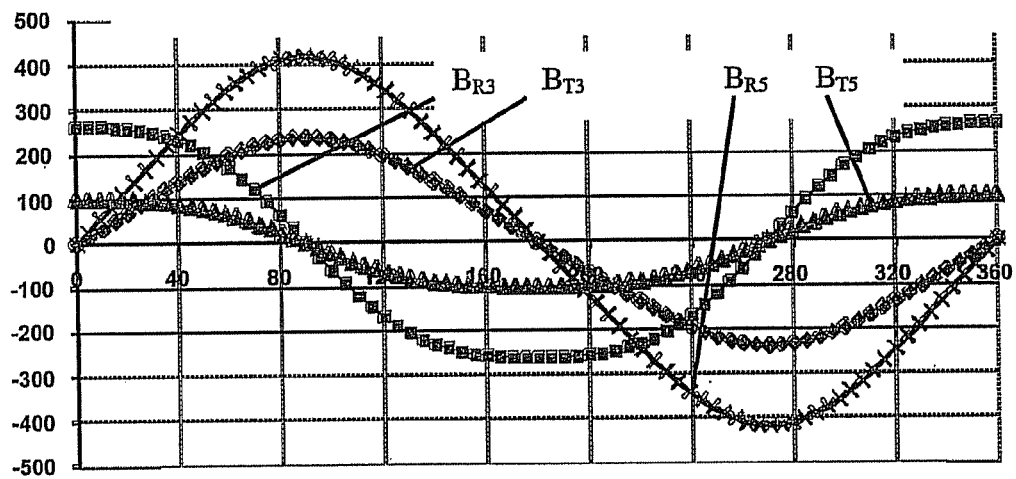
FIG. 13a, is a diagram representing the radial and tangential components of the magnetic induction measured near the permanent magnet in two different positions of the sensor illustrated by FIG. 13.

FIG. 13a represents the radial and tangential components of the magnetic induction measured at the detection elements 3 and 5 of the structure represented in FIG. 12. At the detection element 3, which is near the end of the flux collectors 2a and 2b, the radial component BR3 and the tangential component BT3 of the magnetic induction have amplitudes that are substantially equal. However, at the detection element 5 the ratio of amplitude between the radial component BR5 and the tangential component BT5 of the magnetic induction is close to 4. This amplitude ratio at the component which makes it possible to know the angular position of the magnet over 360° can be compensated electronically although with a small decrease of the sensor performances.

Figure 13B:
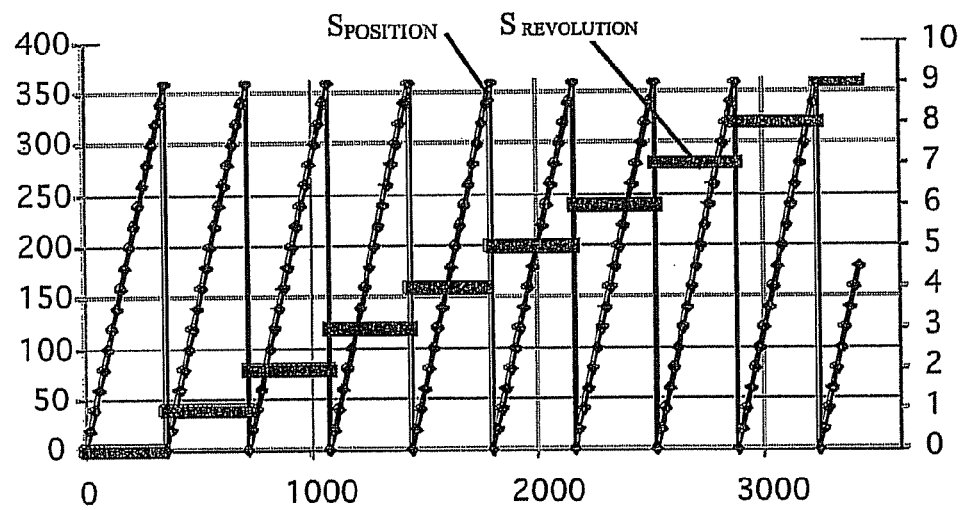
FIG. 13b, is a diagram representing the output signals of both detection elements of the sensor of FIG. 12.

FIG. 13b represents the angular position signals which are provided by the detection element 5 of the sensor of FIG. 12. The first signal $S_{POSITION}$ is linear, which gives the angular position of the magnet over 360°, and periodic of which period is of 360°. The second signal $S_{REVOLUTION}$ provided by the detection element 3, makes it possible to know in an absolute way the number of revolutions performed by magnet 1 and thus has the form of a "step" which increments with the passage of an additional revolution.

Figure 14:
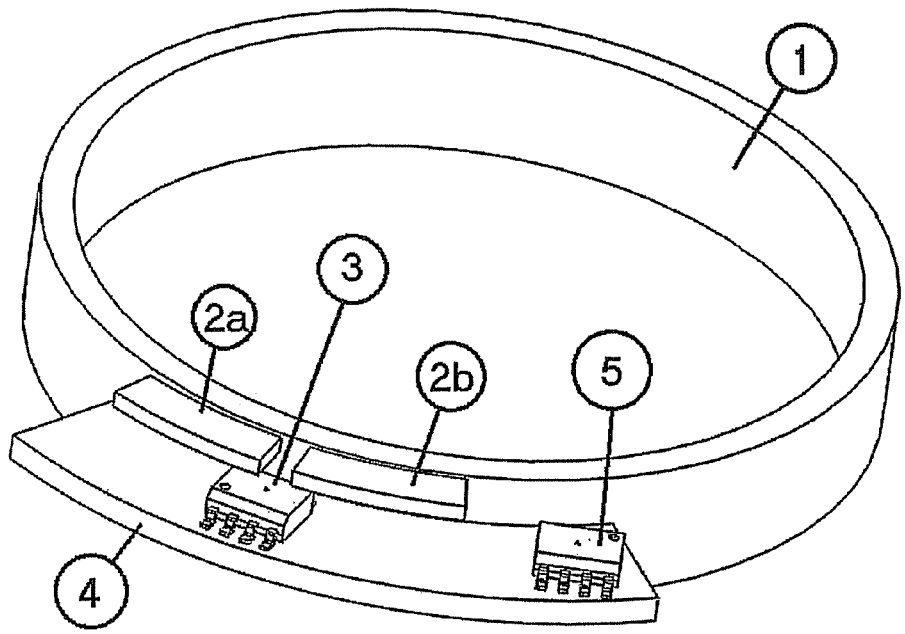
FIG. 14, is a perspective view of an exemplary embodiment of a structure according to the present invention integrating the measurement of the angle of a ring magnet over 360° as well as a revolution number counting device of the permanent magnet with 2 collectors and two components disposed on the same face of a printed circuit.

FIG. 14 represents an alternative of the sensor represented in FIG. 12. This sensor combines two detection elements 3 and 5, respectively, to know the number of revolutions made by the permanent magnet and to know the angular position of the magnet over 360°. The detection element 3 is combined to two flux collectors 2a and 2b in order to compensate the amplitude deviation of the radial and tangential components. In the configuration described in this figure, the detection elements 3 and 5 are located on the same side of a printed circuit 4.

Figure 15:
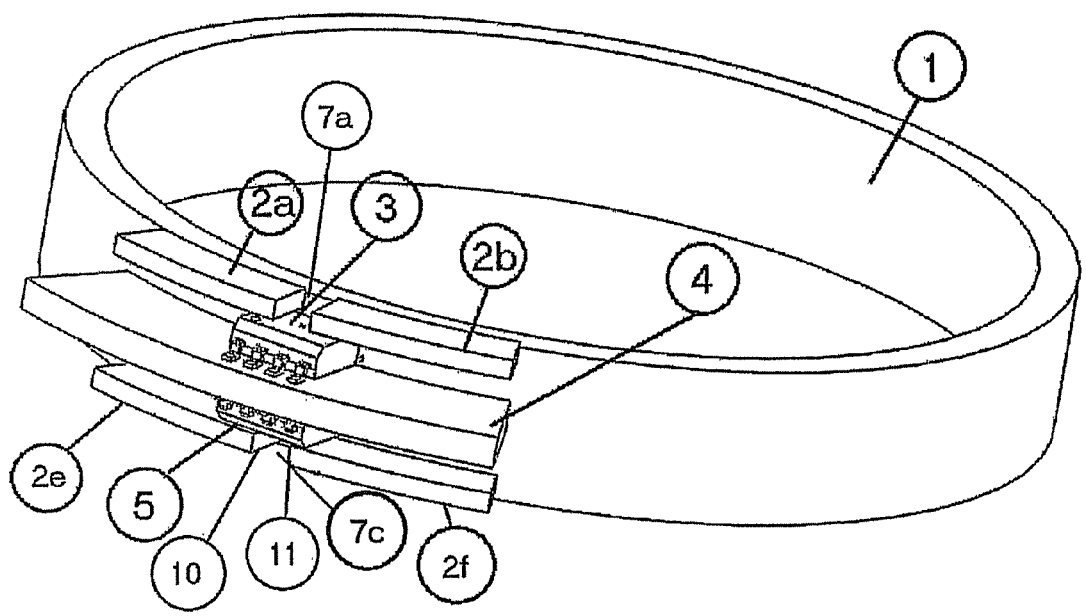
FIG. 15, is a perspective view of an exemplary embodiment of a structure of a rotary sensor according to the present invention integrating the measurement of the angle of the ring magnet over 360° combined to 2 collectors as well as a revolution number counting device of the permanent magnet related to 2 collectors.

FIG. 15 represents a sensor structure that is similar to the structure represented in FIG. 12 except that the flux collectors 2a, 2b, 2e and 2f are 4 in number, collectors 2, 2a and 2b being combined to the detection element 3 which counts the number of revolutions of the permanent magnet and collectors 2, 2e and 2f combined to the detection element 5 which measures the angular position of the permanent magnet over a rotation close to 360°. The combination of the two collectors 2e and 2f to the detection element 5 makes it possible to minimize the amplitude ratio between the radial and tangential components measured at the detection element 5.

Figure 16:
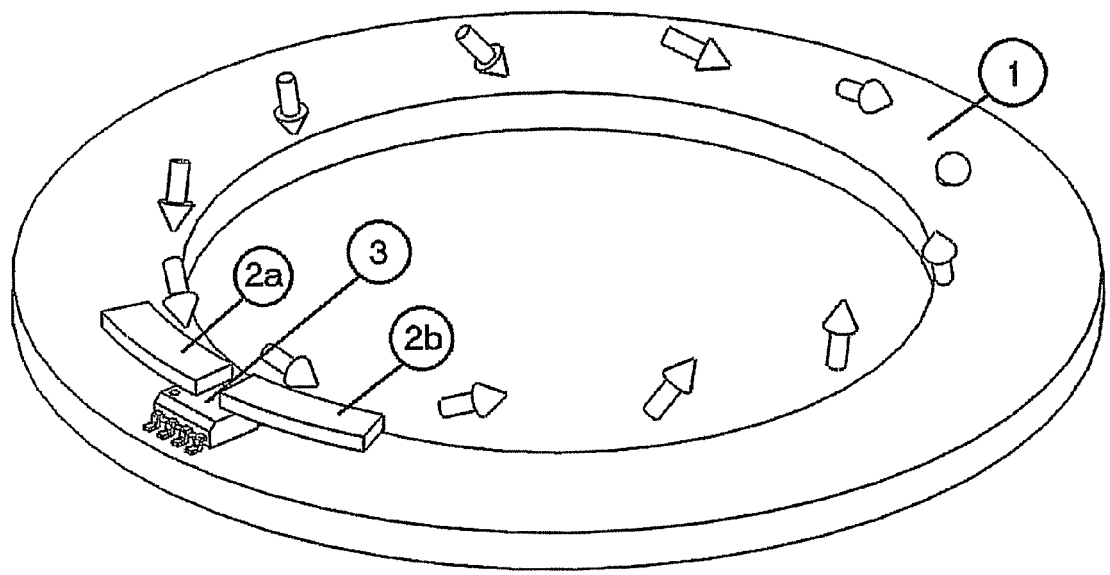
FIG. 16, is a perspective view of an exemplary embodiment of a structure of a rotary sensor according to the present invention which uses a disk magnet presenting a continuously variable magnetization direction along the displacement direction.

FIG. 16 represents an alternative of a rotary sensor according to the present invention, using a disk magnet 1. The variation of the direction of magnetization in magnet 1 is represented. A detection element 3 which is capable of measuring the axial and tangential components of the magnetic induction is positioned above the magnet 1 and near the air gap generated between both flux collectors 2a and 2b.

Figure 17:
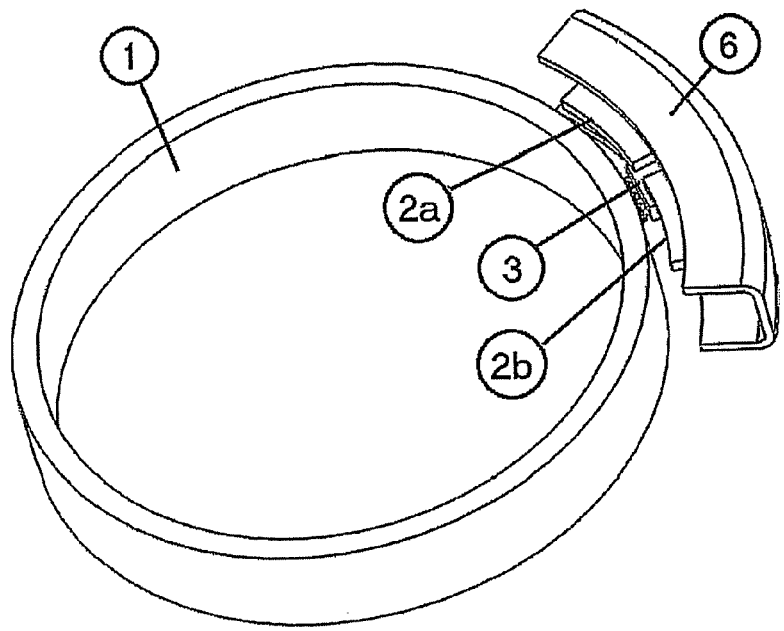
FIG. 17, is a perspective view of an exemplary embodiment of a structure of a rotary sensor with 2 collectors and a shielding to restrict the influence of external magnetic disturbances.

FIG. 17 represents a rotary sensor according to the present invention with a permanent magnet 1, two flux collectors 2a and 2b and a detection element 3 which is capable of measuring the radial and tangential components substantially in a single and same point. A shielding 6 made of ferromagnetic materials is positioned around the detection element 3 and the flux collectors 2a and 2b in order to minimize the influence of a disturbing external field.

Figure 18:
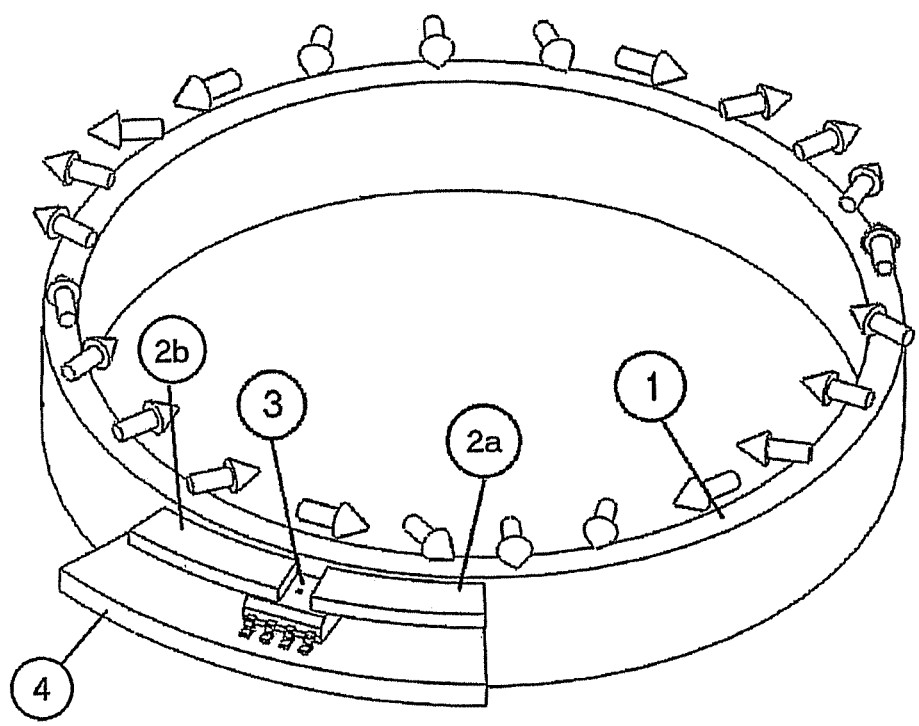
FIG. 18, is a perspective view of an exemplary embodiment of a structure according to the present invention with two flux collectors, a detection element and a multipolar magnet of which the magnetization is periodic over a revolution and exhibits several periods.

FIG. 18 represents a sensor according to the present invention. The structure includes a permanent magnet 1 magnetized according to a function which varies continuously over an angle of 120° and of which pattern is repeated 3 times on the entire ring magnet. The magnetic induction is measured near the magnet and near the end of 2 flux collectors 2a and 2b by means of the detection element 3. The signal over a complete revolution of the magnet is periodic and whose period is identical to that of the magnetization of the permanent magnet. Such a magnetization makes it possible to improve the resolution of the signal over the period of the magnetization pattern, the combination to a period counting device makes it possible to measure the angular position of the magnet on several revolutions with an increased resolution.

The invention claimed is:
1. A contactless position sensor comprising:
at least a permanent magnet emitting a magnetic field, at least one detection element sensitive to the direction of the magnetic field and at least a pair of flux collectors, the permanent magnet being moveable in a displacement direction and exhibiting a direction of magnetization that varies continuously and gradually along the displacement direction;
each flux collector exhibiting at least one portion, provided with an end, extending substantially along the displacement direction of the magnet;
the ends of the pair of flux collectors defining an air gap therebetween oriented along the displacement direction of the magnet; and
the detection element being positioned outside and adjacent to the air gap defined by the ends of the pair of flux collectors, and substantially equidistant from the ends of the pair of flux collectors,
the at least one permanent magnet having an angular position that changes in response to movement in the displacement direction, the angular position of the at least one magnet being calculated by the arctangent of a ratio of two different magnetic induction components that are measured by the detection element.

2. A contactless position magnetic sensor according to claim 1, wherein the direction of magnetization of the permanent magnet varies linearly.

3. A contactless position magnetic sensor according to claim 1, wherein the direction of magnetization of the permanent magnet varies periodically.

4. A contactless position magnetic sensor according to claim 1, wherein the permanent magnet is substantially cylindrical.

5. A contactless position magnetic sensor according to claim 1, wherein the permanent magnet is substantially parallelepiped.

6. A contactless position magnetic sensor according to claim 1, wherein the flux collectors further exhibit a folding portion.

7. A contactless position magnetic sensor according to claim 1, further comprising an additional pair of collectors, each pair of collectors defining an air gap, and the detection element being positioned equidistant from the four ends of the collectors defining the air gaps.

8. A contactless position magnetic sensor according to claim 1, wherein the detection element operably counts in an absolute manner the number of revolutions of the magnet.

9. A contactless angular position magnetic sensor including a sensor according to claim 8, further comprising at least a second detection element operably measuring the angular position of the magnet over 360°.

10. A contactless angular position magnetic sensor according to claim 9, wherein the second detection element is combined to at least a pair of flux detectors, wherein:
   each flux collector exhibits at least a portion, provided with an end, extending substantially along the displacement direction of the magnet;
   the ends of the pair of flux collectors define an air gap oriented along the displacement direction of the magnet; and
   the detection element is positioned outside said air gap and substantially equidistant from the ends.

11. A contactless angular position magnetic sensor according to claim 9, wherein the detection elements are positioned on either side of a printed circuit.

12. A contactless angular position magnetic sensor according to claim 9, wherein the detection elements are coplanar.

13. An angular position magnetic sensor according to claim 1, further comprising a magnetic shielding element disposed in the vicinity of at least one of the detection elements.

14. A position sensor assembly comprising:
   a moveable magnet emitting a magnetic field, the moveable magnet being moveable in a displacement direction and exhibiting a direction of magnetization that varies continuously and gradually along the displacement direction;
   at least one detector mounted on a circuit board, the detector sensing a direction of the magnetic field; and
   at least two flux collectors separated by a gap, with the detector being positioned outside of the gap, the moveable magnet having an angular position that changes in response to movement in the displacement direction, the circuit board being configured to calculate the angular position of the moveable magnet by taking the arctangent of a ratio of two different magnetic induction components, the two different magnetic induction components being radial and tangential components of a tangential induction that are measured by the at least one detector and that exhibit a substantially equal amplitude.

15. The sensor assembly according to claim 14, wherein the flux collectors and detector are spaced away from and do not contact the magnet, the magnet rotating relative to the detector.

16. The sensor assembly according to claim 14, wherein the flux collectors and detector are spaced from and do not contact the magnet, the magnet linearly moving relative to the detector.

17. The sensor assembly according to claim 14, wherein at least one of the flux collectors has a folded shape including multiple bends.

18. The sensor assembly according to claim 14, wherein the at least one detector includes multiple detectors spaced away from each other, operable to sense an angular position of the magnet over a rotation of substantially 360°.

* * * * *